United States Patent
Chang

(10) Patent No.: US 8,826,037 B2
(45) Date of Patent: Sep. 2, 2014

(54) METHOD FOR DECRYPTING AN ENCRYPTED INSTRUCTION AND SYSTEM THEREOF

(75) Inventor: Chih-Chung Chang, Taipei (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 943 days.

(21) Appl. No.: 12/047,333

(22) Filed: Mar. 13, 2008

(65) Prior Publication Data

US 2009/0235090 A1 Sep. 17, 2009

(51) Int. Cl.
*G06F 11/30* (2006.01)
*G06F 17/30* (2006.01)
*H04L 9/08* (2006.01)

(52) U.S. Cl.
CPC .................................. *H04L 9/0825* (2013.01)
USPC ............................................. 713/190; 726/27

(58) Field of Classification Search
CPC .............................. G06F 21/60; G06F 21/805
USPC .............. 713/164, 187, 189, 193; 380/30, 37, 380/279; 726/27
See application file for complete search history.

(56) References Cited

U.S. PATENT DOCUMENTS

| | | | |
|---|---|---|---|
| 5,892,899 A * | 4/1999 | Aucsmith et al. ................ | 726/27 |
| 5,987,557 A * | 11/1999 | Ebrahim .......................... | 710/200 |
| 6,003,117 A * | 12/1999 | Buer et al. ....................... | 711/163 |
| 6,836,843 B2 | 12/2004 | Seroussi | |
| 7,114,178 B2 | 9/2006 | Dent | |
| 7,152,165 B1 | 12/2006 | Maheshwari | |
| 7,290,284 B1 | 10/2007 | Wettergren | |
| 7,542,566 B2 * | 6/2009 | Henry et al. ..................... | 380/37 |
| 2001/0011254 A1 * | 8/2001 | Clark ............................... | 705/59 |
| 2003/0028794 A1 * | 2/2003 | Miller et al. .................... | 713/193 |
| 2003/0182566 A1 * | 9/2003 | Kohara et al. .................. | 713/193 |
| 2003/0226029 A1 * | 12/2003 | Porter et al. .................... | 713/200 |
| 2004/0143748 A1 * | 7/2004 | Yamaguchi et al. ............ | 713/193 |
| 2004/0177269 A1 * | 9/2004 | Belnet et al. .................... | 713/200 |
| 2004/0210762 A1 * | 10/2004 | Kawamoto et al. ............. | 713/193 |
| 2005/0071656 A1 * | 3/2005 | Klein et al. ...................... | 713/193 |
| 2005/0097341 A1 * | 5/2005 | Francis et al. .................. | 713/189 |
| 2005/0182948 A1 * | 8/2005 | Ducharme ...................... | 713/189 |
| 2006/0112213 A1 * | 5/2006 | Suzuoki et al. ................. | 711/100 |
| 2006/0161791 A1 | 7/2006 | Bennett | |
| 2006/0168212 A1 | 7/2006 | Parsons | |
| 2006/0259431 A1 * | 11/2006 | Poisner ............................ | 705/51 |
| 2007/0113079 A1 * | 5/2007 | Ito et al. .......................... | 713/166 |
| 2007/0118891 A1 | 5/2007 | Buer | |
| 2007/0177728 A1 * | 8/2007 | Lee et al. ......................... | 380/37 |
| 2007/0186117 A1 * | 8/2007 | Klein et al. ..................... | 713/189 |

(Continued)

OTHER PUBLICATIONS

Lee et al. Architecture for Protecting Critical Secrets in Microprocessors. 2005. IEEE. pp. 1-12.*

*Primary Examiner* — Michael R Vaughan
*Assistant Examiner* — Abdullah Almamun
(74) *Attorney, Agent, or Firm* — Winston Hsu; Scott Margo

(57) ABSTRACT

Methods of preventing private information, which is hidden within data of a private domain reserved by an application program, from being easily accessed by a CPU and other devices, both where the data of the private domain is decrypted and the access to said data are restricted are disclosed, where the mentioned other devices do not include a decryption module utilized in the methods. Therefore, as long as agreements related to encryptions and decryptions are made in advance between the application program and the decryption module, private information can be well protected.

16 Claims, 7 Drawing Sheets

(56) References Cited

U.S. PATENT DOCUMENTS

| | | | |
|---|---|---|---|
| 2007/0192631 A1* | 8/2007 | Anderson | 713/193 |
| 2007/0198851 A1 | 8/2007 | Goto | |
| 2007/0223685 A1 | 9/2007 | Boubion | |
| 2007/0244827 A1 | 10/2007 | Candelore | |
| 2008/0130893 A1* | 6/2008 | Ibrahim et al. | 380/277 |
| 2009/0013196 A1* | 1/2009 | Ito et al. | 713/193 |
| 2009/0089579 A1* | 4/2009 | Murase et al. | 713/164 |
| 2009/0132776 A1* | 5/2009 | Kurauchi | 711/163 |
| 2009/0187704 A1* | 7/2009 | Rodgers | 711/105 |
| 2009/0187769 A1* | 7/2009 | Camiel | 713/189 |
| 2009/0323951 A1* | 12/2009 | Shingal et al. | 380/247 |
| 2010/0077230 A1* | 3/2010 | Chambers et al. | 713/193 |
| 2010/0153746 A1* | 6/2010 | Takeuchi et al. | 713/193 |

* cited by examiner

METHOD FOR DECRYPTING AN ENCRYPTED INSTRUCTION AND SYSTEM THEREOF

BACKGROUND OF THE INVENTION

1. Field of the Invention

The present invention relates to a method for decrypting and a system related to the method, and more particularly, to a method for decrypting an encrypted instruction and a system related to the method.

2. Description of the Prior Art

Please refer to FIG. 1, which illustrates a conventional computer system 10. The computer system 10 includes a central processing unit (CPU) 20, a memory controller 30, a random access memory 31 (RAM), a peripheral device controller 40, a peripheral device module 45, and a system bus 50. The CPU 20, the memory controller 30, and the peripheral device controller 40 are connected through the system bus 50. The CPU 20 may read/write data stored in the RAM 31 through the memory controller 30.

An application program includes sequential instructions to request the computer system 10 for performing required operations of the application program. Multiple application programs may be executed at a same time under the management of an operation system. For example, a video playback program and an Internet browsing program may be executed simultaneously with the aid of a multitasking operating system. The application program will be loaded into the RAM 31, and be executed in a step-by-step manner under the control of the operation system, which manages hardware resources including the CPU 20, the memory controller 30, the peripheral device controller 40, and etc. Therefore, the computer system 10 is capable of providing users with various functions designed and installed within the application program.

In a popular application program, such as a game played on a personal computer, there must be certain private information, which has to be kept secret for users of the application program. The private information of the application program may include serial numbers, instructions for running valuable programs based on secret algorithms, authorization keys for running primary and auxiliary programs, and etc. If the private information is not kept secret from common users of the application program, certain malicious users may be able to pirate the entire application program or spread the authorization keys without legal permissions.

In brief, legal profits related to the application program cannot be ensured while the private information of the application program is not strictly secured from being accessed by those who are not authorized.

SUMMARY OF THE INVENTION

The claimed invention discloses a method for decrypting an encrypted instruction. The method comprises receiving an encrypted instruction, decrypting the encrypted instruction by using a key included in decryption information, and transmitting the decrypted instruction into a processing unit.

The claimed invention also discloses a computer system related to the above-disclosed method. The computer system comprises a processing unit, a memory, and a decryption module. The memory is coupled to the processing unit, and is utilized for storing both a key and an encrypted instruction. The decryption module is coupled to both the memory and the processing unit. The decryption module decrypts the encrypted instruction by using the key, and transmits the decrypted instruction to the processing unit.

These and other objectives of the present invention will no doubt become obvious to those of ordinary skill in the art after reading the following detailed description of the preferred embodiment that is illustrated in the various figures and drawings.

DETAILED DESCRIPTION

For securing private information of an application program so as to ensure legal profits related to the application program, decryption methods for protecting private information are disclosed in the present invention.

Figure 1:
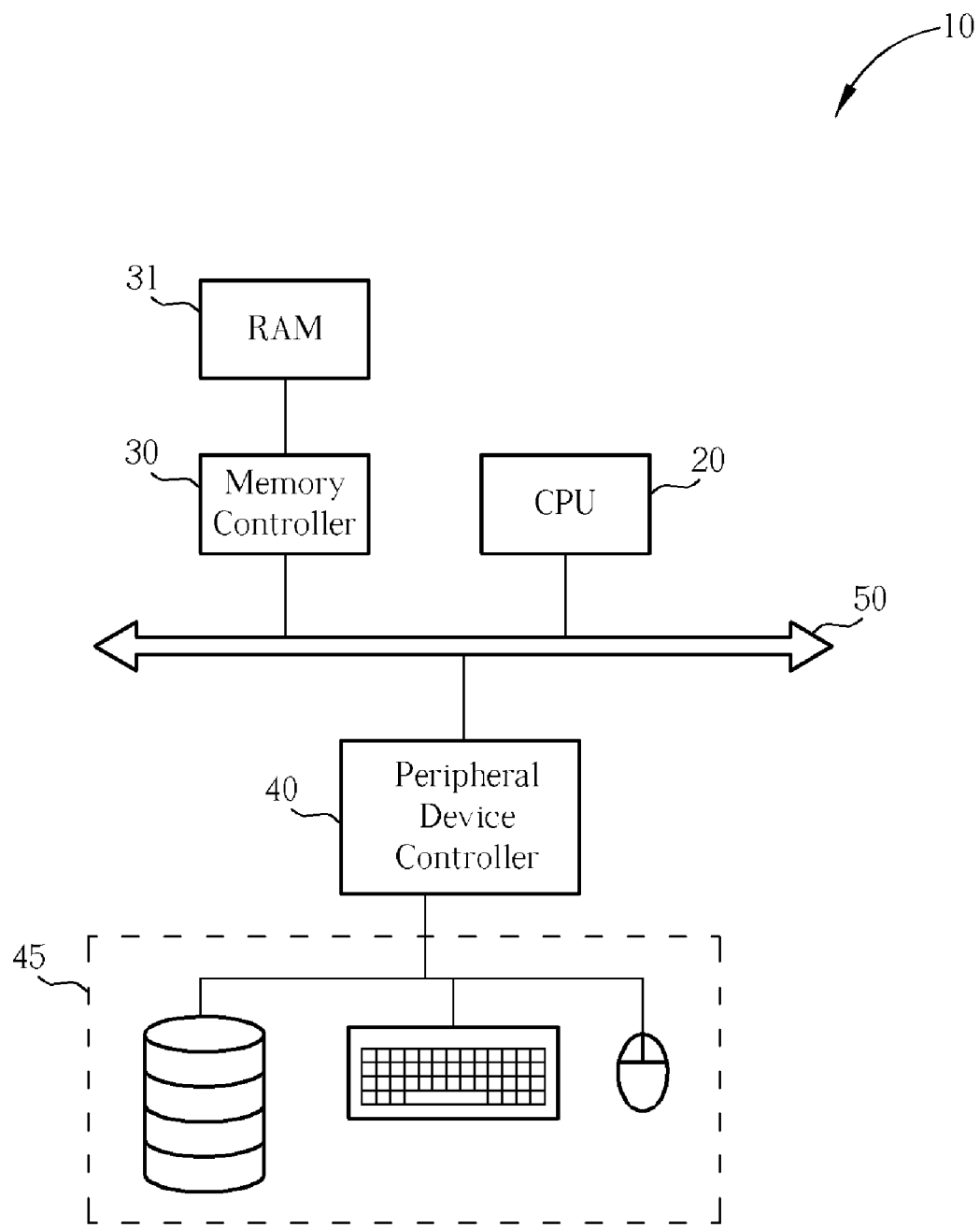
FIG. 1 is a diagram of a conventional computer system.
Figure 2:
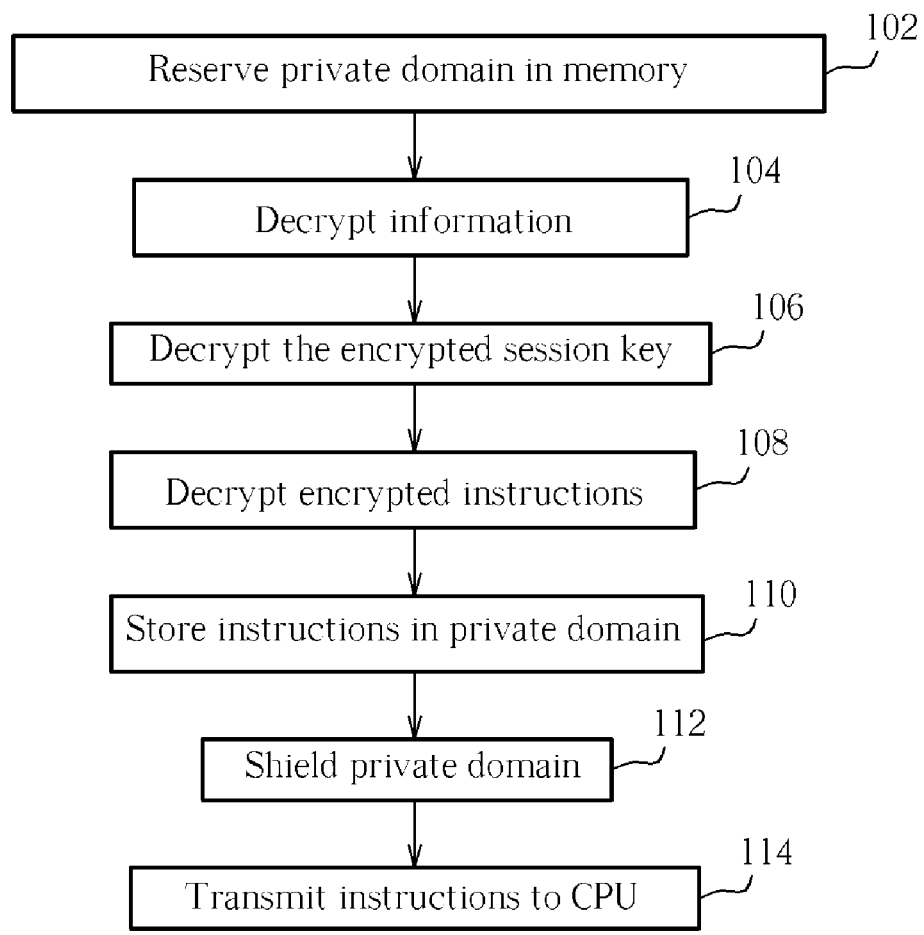
FIG. 2 is a diagram of the decryption method for restricting executions related to private information on a target according to a first embodiment of the present invention.
Figure 3:
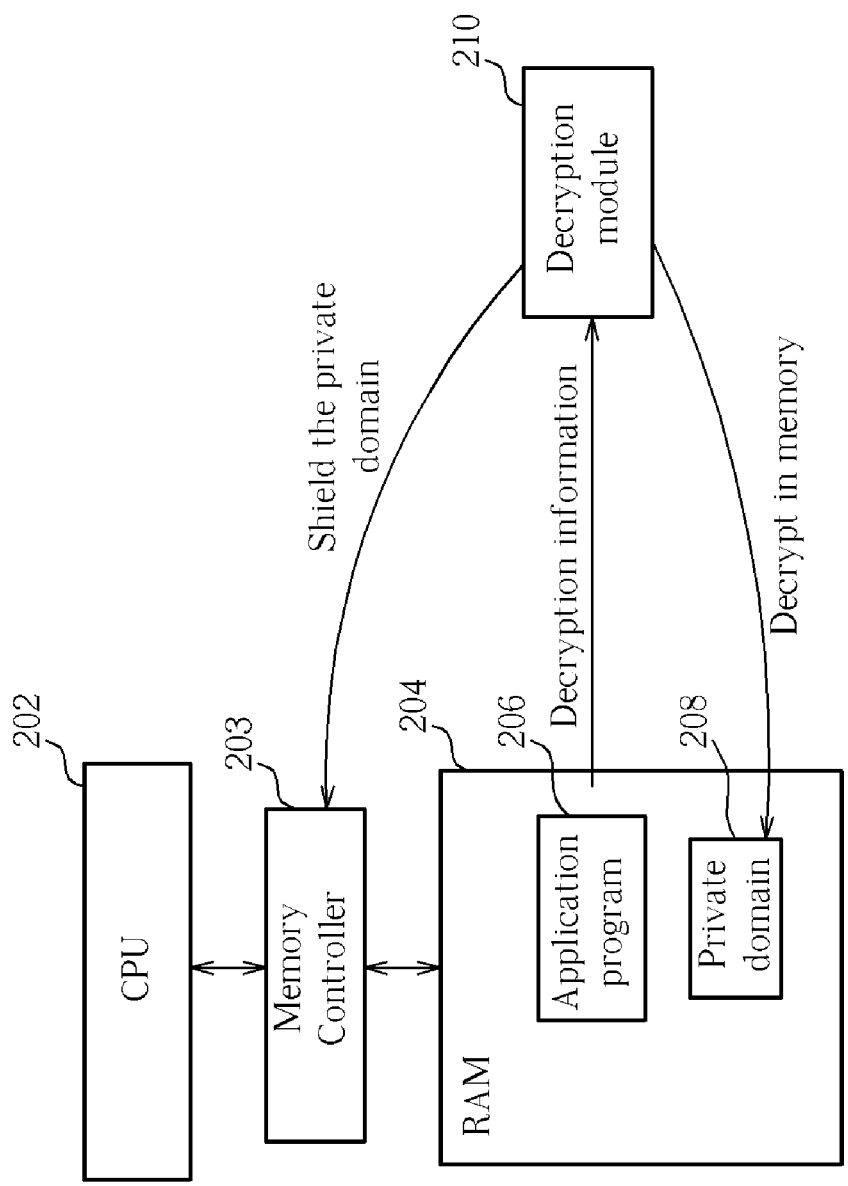
FIG. 3 illustrates the decryption method according to the first embodiment of the present invention.

Please refer to FIG. 2 and FIG. 3. FIG. 2 is a diagram of the decryption method for restricting executions related to private information on a target according to a first embodiment of the present invention. FIG. 3 illustrates the decryption method according to the first embodiment of the present invention.

As shown in FIG. 3, an application program 206 is loaded into a memory 204, which may be a random access memory in a preferred embodiment of the present invention. A private domain 208 in the memory 204 is reversed for the request of the application program 206. A CPU 202 may execute instructions of the application program 206 under the control of a memory controller 203. A decryption module 210 is provided for processing procedures related to the private domain 208. The decryption module 210 is equipped with required algorithms or keys from a publisher of the application program 206. The decryption module 210 is implemented as built-in hardware along with the CPU 202 and the memory 204, i.e., all of the CPU 202, the memory 204, and more particularly, the decryption module 210 may be disposed within a same computer system. Moreover, under certain circumstances, the decryption module 210 may be disposed within the CPU 202.

In order to control the authorities of accessing the application program 206, the publisher may encrypt specific instructions with a session key so that the specific instructions are kept secret. The specific instructions may be a part of the whole application program 206 to perform a specific function of the application program 206, such as authority verification of the application program 206. Therefore, the computer system may be restricted from executing the specific function or all functions of the application program 206 since the computer system does not have the specific instructions in plaintext. The session key may be encrypted with a public key and delivered to the user before the application program 206 is loaded into the memory 204. The user may receive the encrypted session key embedded in the application program 206 or receive the encrypted session key through the network. In Step 102, while the application program 206 is loaded into the memory 204, said application program 206 requests the memory 204 to reserve a private domain 208 in said memory 204, where the private domain 208 stores all private or classified information of said application program 206. Please note that said private domain 208 is shielded to prevent the accesses from other devices except for the decryption module 210 while the application program 206 requests to reserve the private domain 208 or later.

In Step 104, after the application program 206 is loaded into the memory 204, the decryption module 210 receives decryption information from the application program 206. The decryption information includes the encrypted session key, the encrypted instructions, and a target where data of the private domain 208 is going to be decrypted. In detail, the target indicates a starting location of storing the decrypted data, and a length for storing said decrypted data in the memory 204. Note that the decryption module 210 is supposed to own the private key corresponding to the public key utilized for encrypting the session key. Therefore in Step 106, the encrypted session key is directly extracted and decrypted from the decryption information by the decryption module 210.

In Step 108, the encrypted instructions are decrypted with the decrypted session key by the decryption module 210. In Step 110, the decrypted instructions is directly stored into the target indicated by the provided decryption information. In Step 112, the decryption module 210 submits a request for shielding the private domain 208. The request for shielding the private domain 208 is received by the memory controller 203 and prevents the private domain 208 from being accessed by any devices other than the decryption module 210. In addition, a flag of the target is set to indicate a circumstance that a domain of said target is execution-only for the CPU 202. Thus, all of the devices other than the decryption module 210 cannot access said stored instructions in the private domain 208, and are merely granted to execute the stored instructions. While the decrypted instructions of the program 206 are required to be executed, the instructions stored in the private domain 208 will be transmitted to CPU 202, as shown in step 114. Because the stored data in the private domain 208 cannot be accessed by all of the CPU 202 and other devices except for the decryption module 210, private information within said private domain 208 is well protected. Please note that the request of shielding the private domain 208 may also be received by the CPU 202 to control the access of the private domain 208.

Note that in Step 108, other encrypted codes, which are encrypted with the public key and included in the application program 206, may also be provided along with the decryption information. The encrypted instructions may carry additional information related to the data of the private domain 208 while said data is decrypted. A digital signature may also be included in the decryption information for identifying an origin of the application program 206. After receiving the digital signature from the application program 206, the decryption module 210 verifies the validity of the digital signature. The decryption module 210 may not execute the above-described decrypting steps without the correct digital signature. Similarly, it is an alternative solution to decrypt the encrypted instructions after verifying the validity of the digital signature.

Figure 4:
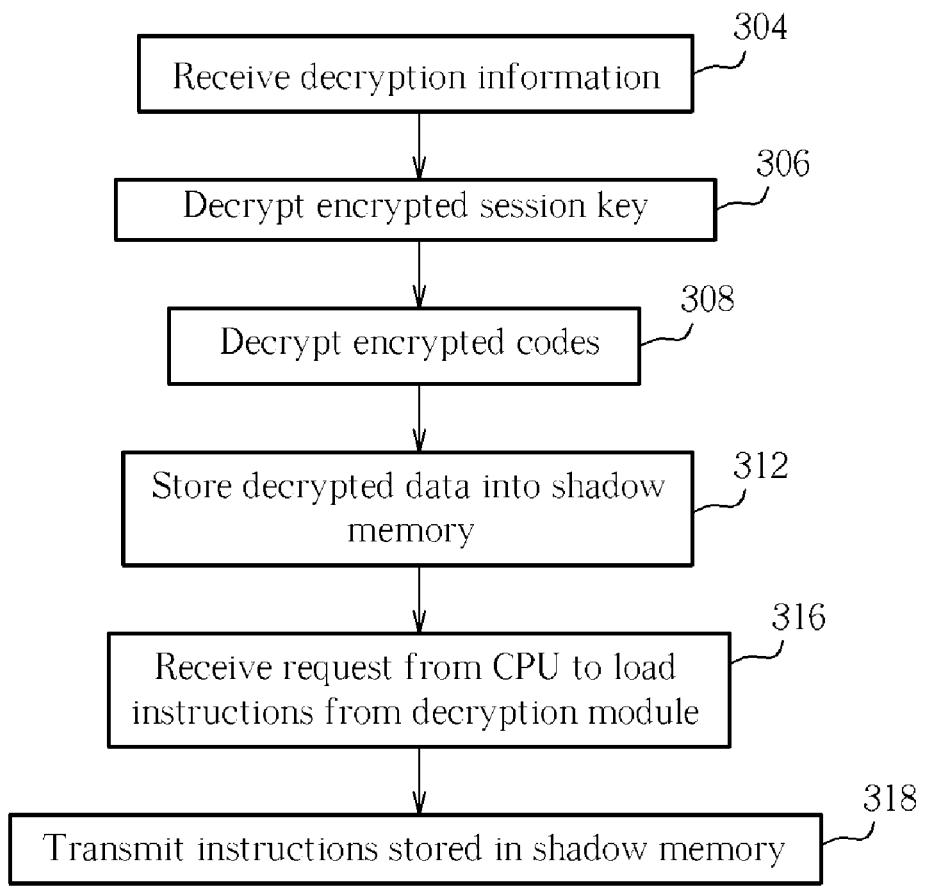
FIG. 4 is a diagram of the decryption method of decrypting data of a private domain in a shadow memory manipulated by a decryption module according to a second embodiment of the present invention.
Figure 5:
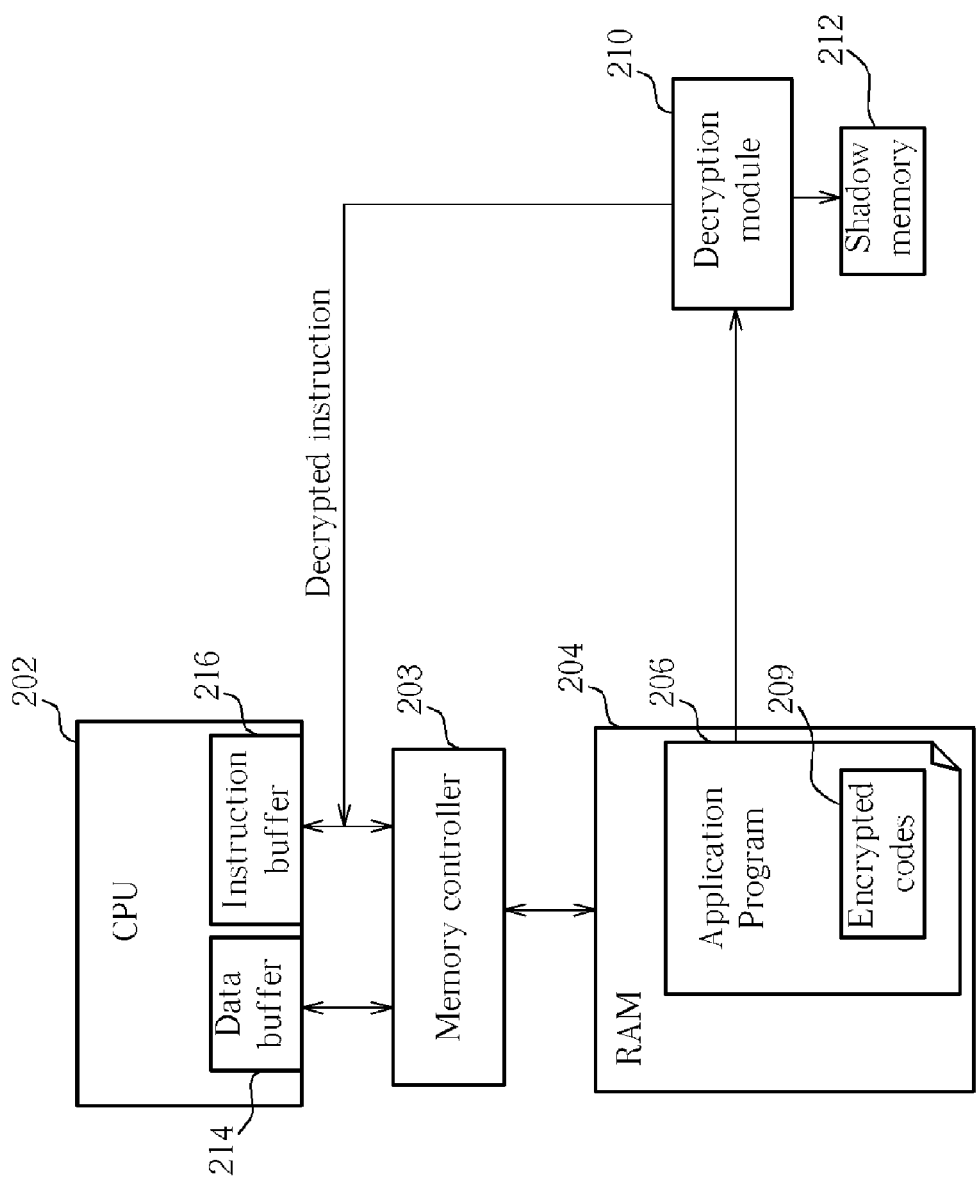
FIG. 5 is a diagram for describing the decryption method shown in FIG. 4 according to the second embodiment of the present invention.

In a second embodiment of the present invention, the decrypted data of the private domain 208 is decrypted in a shadow memory 212 directly manipulated by the decryption module 210. Please refer to FIG. 4 and FIG. 5. FIG. 4 is a diagram of the decryption method of decrypting data of a private domain in a shadow memory manipulated by a decryption module according to a second embodiment of the present invention. FIG. 5 is a diagram for describing the decryption method shown in FIG. 4 according to the second embodiment of the present invention. Most descriptions related to elements illustrated in FIG. 3 are suitable for descriptions related to same elements illustrated in FIG. 5 so that repeated descriptions are omitted for brevity.

In FIG. 5, the decryption module 210 further utilizes a shadow memory 212 for storing all data from encrypted codes 209 so that the decrypted data from the encrypted codes 209 may be restricted in the shadow memory 212. Furthermore, the CPU 202 further includes a data buffer 214 and an instruction buffer 216. The data buffer 214 is responsible for all accesses to the memory 204. The instruction buffer 216 is responsible for receiving instructions from the memory 204 or the shadow memory 212.

In Step 304, decryption information related to data of the encrypted codes 209 is provided to the decryption module 210. The decryption information includes the encrypted session key and a range of the encrypted codes 209 in the memory 204. The decryption module 210 has the private key for decrypting the encrypted session key. In Step 306, the decryption module 210 extracts the encrypted session key from the decryption information and decrypts said encrypted session key with the private key owned by the decryption module 210. In Step 308, the encrypted codes 209 are decrypted by the decryption module 210 and by using the decrypted session key. Note that the range of the encrypted codes 209 in the memory 204 may be indicated with consecutive pages, blocks, or addresses in said memory 204.

Note that the shadow memory 212 is a device other than the memory 204, which may be individually coupled to the decryption module 210. Any other devices will not identify or perceive the existence of the shadow memory 212. Therefore, after the encrypted codes 209 are decrypted by the decryption module 210 in Step 308, the decrypted codes may be directly stored into the shadow memory 212 in Step 312. While the application program 206 is required to execute the instructions stored in the shadow memory 212, the CPU 202 issues a request to load the instructions from the decryption module 210 in Step 316. After receiving the request from the CPU 202, the decryption module 210 transmits corresponding instructions stored in the shadow memory 212 to the instruction buffer 216, in Step 318. Through decrypting the private information by the decryption module 210 and storing the decrypted instructions in the shadow memory 212, the CPU 202 cannot retrieve any information from the shadow memory 212 so that the encrypted codes 209 are kept secret. Note that in other embodiments of the present invention, the shadow memory 212 may be disposed inside the decryption module 210.

Figure 6:
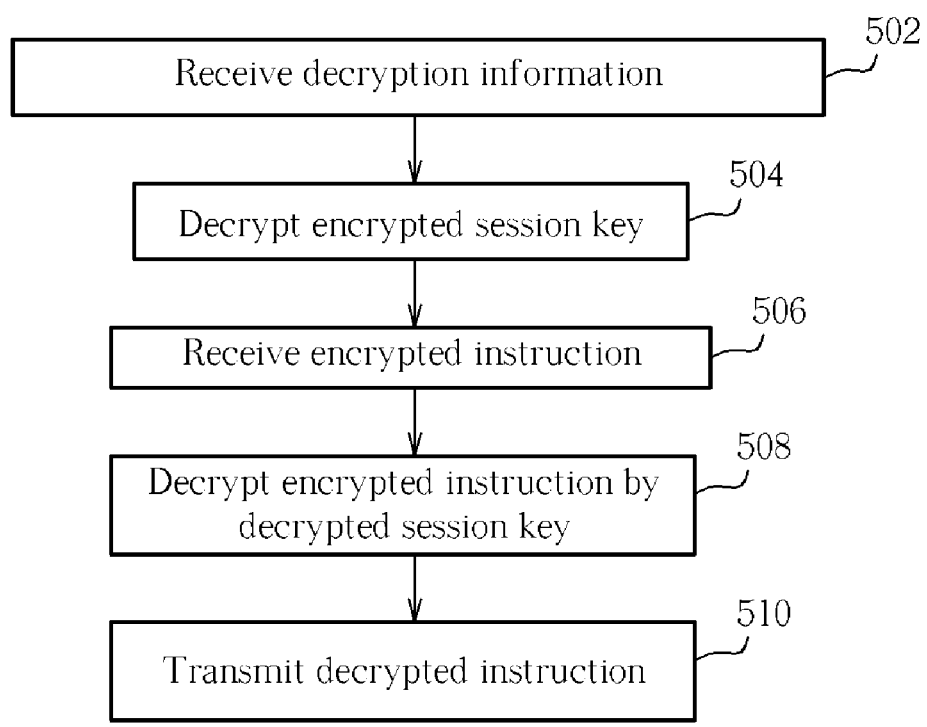
FIG. 6 is a diagram of the decryption method of decrypting private information in an on-the-fly manner according to a third embodiment of the present invention.
Figure 7:
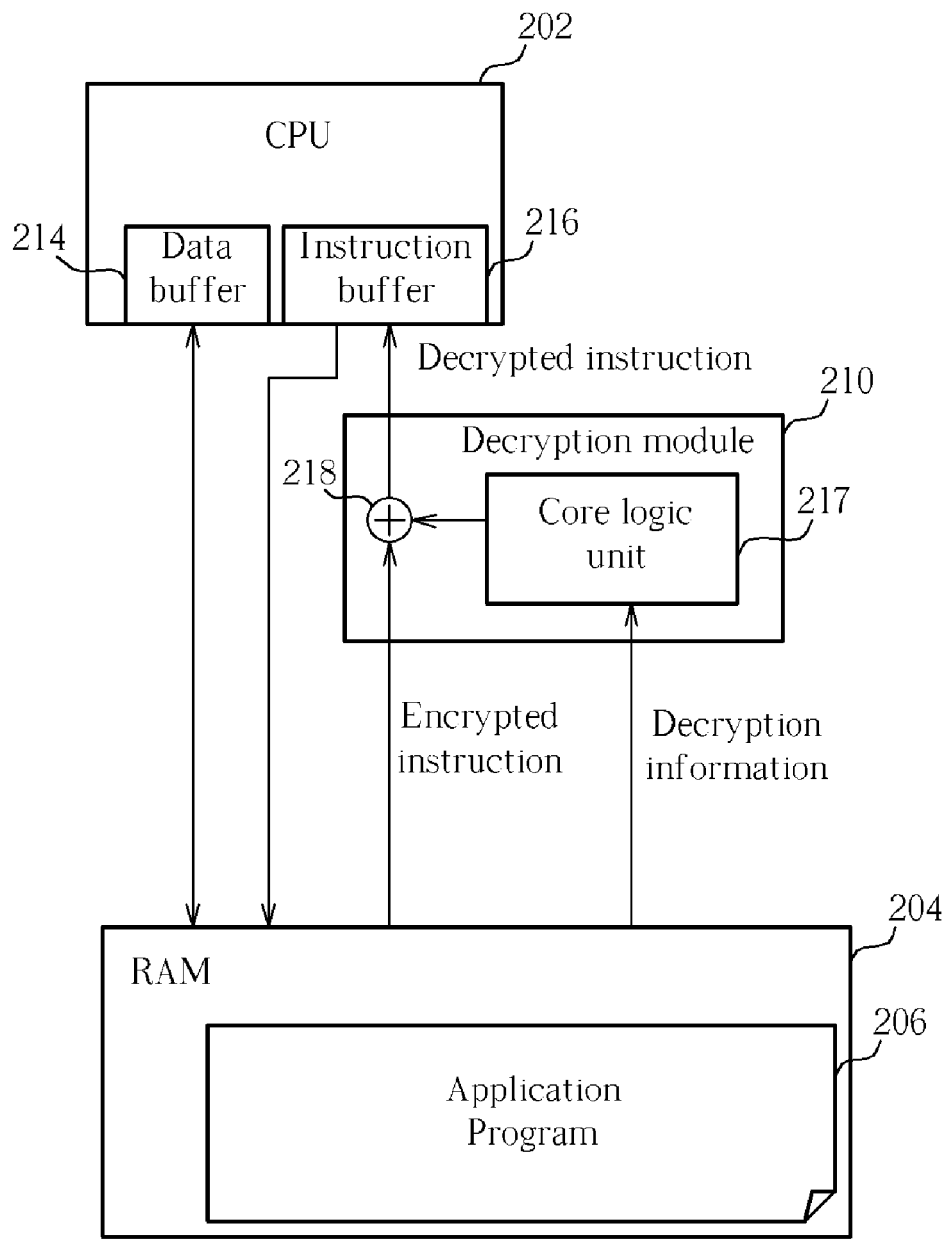
FIG. 7 is a diagram for describing the decryption method shown in FIG. 6 according to the third embodiment of the present invention.

In a third embodiment of the present invention, a decryption technique called on-the-fly decryption is used. On-the-fly decryption refers to the fact that data is accessible immediately after providing a corresponding public key or private key, so that the decrypted data is made just as accessible as any undecrypted data. Please refer to FIG. 6 and FIG. 7. FIG. 6 is a diagram of the decryption method of decrypting private information in an on-the-fly manner according to a third embodiment of the present invention. FIG. 7 is a diagram for describing the decryption method shown in FIG. 6 according to the third embodiment of the present invention. Elements shown in FIG. 7 are similar with those in FIG. 3 and FIG. 5 so that repeated elements are not described further.

In Step 502, decryption information is provided for the decryption module 210. The decryption information includes the encrypted session key. A core logic unit 217 of decryption module 210 has a private key corresponding to the public key for encrypting the session key. Note that the decryption information may further include encrypted codes, which are encrypted with the public key, for providing additional information related to the data of the private domain 208 for the decryption module 210. In Step 504, the core logic unit 217 decrypts the encrypted session key by using the private key.

In Step 506, encrypted instructions are received from the application program 206. Then, the encrypted instructions are decrypted in Step 508, and the decrypted instructions are transmitted to an instruction buffer 216 of the CPU 202 in Step 510. In the current embodiment of the present invention, an exclusive- or logic operation related to both the encrypted instructions and the session key is utilized for decrypting the encrypted instructions. An exclusive- or logic unit 218 may be designed for decrypting the encrypted instructions by stream-ciphering or block-ciphering.

Similar with the case in FIG. 4 and FIG. 5, the CPU 202 sends a request to the decryption module 210. Then the decryption module 210 decrypts the encrypted instructions according to the decryption information, and returns the decrypted instructions back to the instruction buffer 216. More particularly, the core logic unit 217 generates a plurality of bits from the session key. The logic operation between the generated bits from the core logic unit 217 and encrypted instructions is performed for decryption, where the logic operation may be an exclusive- or (XOR) operation. In addition, the decryption module 210 may further decrypt the session key according to a digital signature from the application program 206. Without legal authorization of the applications program 206, the decryption module 210 may not perform the decrypting steps nor be able to decrypt the correct instructions.

The present invention discloses a few decryption methods for preventing private information within the data of the private domain reserved by the application program, from being easily accessed by the CPU and other devices except for the decryption module 210. By restricting where the data of the private domain is decrypted, or by restricting the access to said data, the private information can be well protected as long as agreements related to encryptions and decryptions are made in advance between the application program and the decryption module, i.e., according to the published public key and the private key owned by the decryption module. Note that cipher algorithms used in the decryption module in embodiments of the present invention may include symmetric key algorithms, such as DES or AES, and asymmetric key algorithms, such as RSA. The decryption methods of the present invention may also be utilized on digital resource management (DRM) systems installed on personal computers, such as advance access content systems (AACS) or Windows Media DRM.

Those skilled in the art will readily observe that numerous modifications and alterations of the device and method may be made while retaining the teachings of the invention.

What is claimed is:

1. A method for decrypting an encrypted instruction comprising:

receiving an encrypted instruction;
decrypting the encrypted instruction to a decrypted instruction by using a key included in a decryption information;
storing the decrypted instruction in a private domain of the memory;
submitting a request for shielding the private domain; and
transmitting the decrypted instruction into a processing unit;
wherein the decryption information further includes a range of the private domain indicating consecutive pages, blocks, or addresses occupied by said private domain and in the memory.

2. The method of claim 1 further comprising:
receiving the decryption information including an encrypted session key; and
generating the key by decrypting the encrypted session key.

3. The method of claim 2 further comprising:
verifying whether a digital signature included in the decryption information is valid; and
decrypting the encrypted session key included in the decryption information if the digital signature is valid.

4. The method of claim 2 wherein the encrypted session key is decrypted by using a private key.

5. The method of claim 1 wherein the request for shielding the private domain is received by the processing unit.

6. The method of claim 1 wherein the request for shielding the private domain is received by a memory controller.

7. The method of claim 1 further comprising:
storing the decrypted instructions in a shadow memory.

8. The method of claim 1 wherein the decryption information further includes a digital signature for identifying an origin of the application program.

9. The method of claim 8 further comprising:
verifying whether the digital signature is valid; and
decrypting the encrypted instructions by using the key included in the decryption information if the digital signature is valid.

10. The method of claim 1 further comprising:
executing the decrypted instruction by the processing unit.

11. The method of claim 1, wherein decrypting the encrypted instructions by using a key included in the decryption information comprises:
generating a plurality of bits from the key; and
performing a logic operation on the encrypted instructions and the bits from the key to generate the decrypted instruction.

12. The method of claim 11, wherein the logic operation is an exclusive-or operation.

13. A computer system comprising:
a processing unit;
a memory coupled to the processing unit and utilized for storing a key and an encrypted instruction;
a shadow memory coupled to the decryption module for storing the decrypted instruction;
a decryption module coupled to the memory and the processing unit, wherein the decryption module decrypts the encrypted instruction to a decrypted instruction by using the key, and transmits the decrypted instruction to the processing unit; and
a memory controller for controlling access of the memory and for shielding a private domain of the memory according to a request from the decryption module;
wherein the decryption information further includes a range of the private domain indicating consecutive pages, blocks, or addresses occupied by said private domain and in the memory.

14. The computer system of claim 13 wherein the key stored in the memory is an encrypted session key.

15. The computer system of claim 14 wherein the decryption module comprises:
- a first logic unit for decrypting the encrypted session key by using a private key; and
- a second logic unit for decrypting the encrypted instruction using the encrypted session key.

16. The computer system of claim 13, wherein the decryption module comprises:
- a core logic unit for generating a plurality of bits from the key; and
- an exclusive-or logic unit for operating on both the encrypted instruction and the plurality of bits generated from the key.

\* \* \* \* \*